United States Patent

Yamazaki et al.

[11] Patent Number: 5,264,814
[45] Date of Patent: Nov. 23, 1993

[54] ELECTRICAL NOISE ABSORBER

[75] Inventors: Yasuo Yamazaki, Tougane; Yoshiaki Yanase, Nagoya, both of Japan

[73] Assignee: Kitagawa Industries Co., Ltd., Japan

[21] Appl. No.: 838,553

[22] Filed: Feb. 19, 1992

[30] Foreign Application Priority Data

Jun. 13, 1991 [JP] Japan .................. 3-44478[U]
Aug. 23, 1991 [JP] Japan .................. 3-25251

[51] Int. Cl.$^5$ .................. H01F 15/02; H01F 27/26
[52] U.S. Cl. .................. 336/65; 29/606; 324/127; 333/12; 336/175; 336/197; 336/210
[58] Field of Search .................. 324/127; 333/81 R, 12, 333/182, 243, 183; 335/303, 285, 299; 336/174, 197, 233, 175, 176, 92, 229, 212, 210, 90, 65; 29/602.1, 606

[56] References Cited

U.S. PATENT DOCUMENTS

| | | | |
|---|---|---|---|
| D. 318,045 | 7/1991 | Fujioka . | |
| 4,882,561 | 11/1989 | Fujioka | 336/65 |
| 4,885,559 | 12/1989 | Nakano . | |
| 4,972,167 | 11/1990 | Fujioka | 336/65 |
| 5,003,278 | 3/1991 | May | 336/175 |

FOREIGN PATENT DOCUMENTS 2223887 4/1990 United Kingdom .

*Primary Examiner*—Thomas J. Kozma
*Attorney, Agent, or Firm*—Davis, Bujold & Streck

[57] ABSTRACT

An electrical noise absorber comprising a magnetic body like ferrite attached around a flat cable and a fixing member. The fixing member comprises an inserting portion having a through hole for passing the magnetic body therethrough. Opposite walls defining the through hole extend in the direction, in which the magnetic body is inserted, to form a pair of cable fixing arms. Each of the cable fixing arms has a slot and projections for engaging the side edges of the flat cable. Engaging portions for engaging the periphery of the magnetic body inserted into the fixing members are provided on the top and bottom of the inserting portion. The flat cable and the magnetic body can thus be held immobile by the fixing members of the electrical noise absorber. The fixing members can stably support even a flat cable narrower than the inner dimension of the magnetic body, because the fixing members have the through holes which allow the fixing members to be slid along the length of the magnetic body according to the width of the flat cable.

19 Claims, 9 Drawing Sheets

1

ELECTRICAL NOISE ABSORBER

BACKGROUND OF THE INVENTION

This invention relates to an electrical noise absorber and, in particular, to an electrical noise absorber provided with a magnetic body attached to a flat cable of an electronic device for absorbing electrical noise which is generated within the device or which enters from the outside into the device through the flat cable, and a magnetic body fixing device for supporting the flat cable in the magnetic body.

The applicant of this invention proposed such electrical noise absorber in U.S. Design Patent No. 318,045, in which the ferrite core as a magnetic body held in a pair of ferrite core holders is attached around a wire ribbon to absorb electrical noise flowing through the wire ribbon. As shown in FIG. 11, a ferrite core 533 is attached around a wire ribbon 531 composed of multiple signal wires, and absorbs electrical noise flowing through the wire ribbon 531. The ferrite core 533 is composed of an upper piece disposed over a lower piece in the direction shown by an arrow B in FIG. 11. In the middle of the ferrite core 533, a slot 535 is formed by recesses in the upper and lower pieces for passing through the wire ribbon 531. Both side edges of the ferrite core 533 are held by ferrite core holders 537 having ferrite core presses or securing members 539 for pressing the upper and lower pieces of the ferrite core 533 toward one another. A sufficient magnetic flux density is thus developed in the ferrite core 533 for effectively absorbing the electrical noise flowing through the wire ribbon 531. The ferrite core holders 537 have guide slots 541 for receiving the side edges of the wire ribbon 531 when the ferrite core holders 537 are attached to the ferrite core 533 around the wire ribbon 531.

As shown in FIG. 12, however, when the width La of the wire ribbon 531 is smaller than the inner dimension Lb of the ferrite core 533, the ferrite core 533 is displaceable relative to the wire ribbon 531. If the surface of the wire ribbon 531 peels off or is worn because of the slippage of the ferrite core 533 around the wire ribbon 531, the signal wires of the wire ribbon 531 are exposed to the environment, thus causing a short circuit.

SUMMARY OF THE INVENTION

Wherefore, an object of this invention is to provide an electrical noise absorber that securely holds a flat cable without allowing the noise absorber to be laterally displaced relative to the flat cable.

Other objects and benefits of the invention will become apparent from the detailed description which follows hereinafter when taken in conjunction with the drawing figures which accompany it.

To solve this and other objects, this invention provides an electrical noise absorber comprising a magnetic body for attaching around a flat cable connected to an electronic device and absorbing electrical noise flowing through the flat cable, and a holder mechanism or member for securely fixing the magnetic body around the flat cable. The holder mechanism or member comprises an inserting portion having a through hole for engaging the side edge portions of the magnetic body, an engaging portion for engaging the periphery of the magnetic body inserted through the through hole of the fixing mechanism or member, and a pair of cable fixing portions extending from opposite side portions defining the through hole of the inserting portion, in the direction in which the magnetic body is inserted. The cable fixing portions have a slot for inserting and holding the side edges of the flat cable.

Since the hole for engaging the magnetic body is provided in the magnetic body inserting portion of the fixing member, the side edges of the magnetic body can be inserted through the hole, and the fixing member can be slid to a given position along the length of the magnetic body. The fixing members can engage the magnetic body at a given position by their magnetic body engaging portions. Since the slots for inserting and engaging the side edges of the flat cable are provided in the cable fixing portions, the fixing members can securely hold the flat cable. Specifically, a pair of the fixing members are first attached to both side edges of the magnetic body so that the flat cable is held between the fixing members. The fixing members are then pushed inwardly until the inner edges of the cable fixing portions contact the side edges of the flat cable. The flat cable and the magnetic body can thus be adhered to each other through a pair of the fixing members. Consequently, even if the width of the flat cable is narrower than the inner dimension of the magnetic body, the magnetic body and the flat cable are both firmly supported by a pair of the fixing members. The electrical noise absorber having the aforementioned structure can be prevented from being displaced laterally from the flat cable.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1:
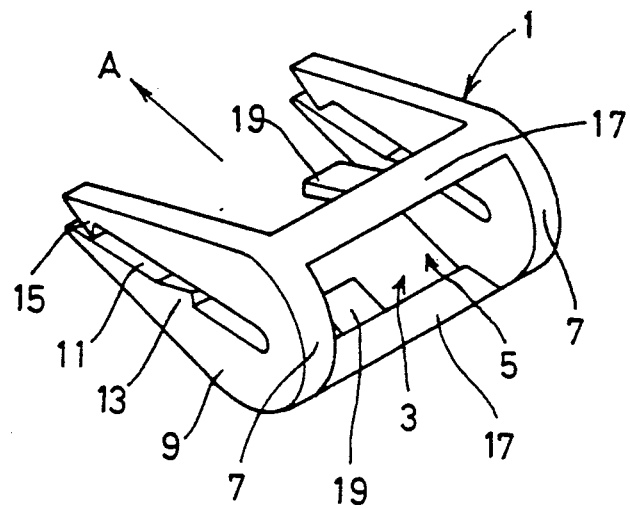
FIG. 1 is a perspective view of a fixing member of an electrical noise absorber for the first embodiment of this invention.

As shown in FIG. 1, a fixing member 1 is composed of a magnetic body guide 5 having a hole 3 penetrating through the fixing member 1 for inserting a magnetic body 23. The hole 3 is defined by opposed curved walls 7 which extend to form a pair of arms 9 along the longitudinal direction of the fixing member 1 shown by an arrow A corresponding to the direction in which the magnetic body 23 is inserted. Each pair of the arms 9 has a guide slot 11 therebetween, a projection 13 and a hook 15 for holding the side edge of a flat cable 21. In the magnetic body guide 5, opposing cross beams 17 are each provided with press or securing members 19 for pressing or securing the magnetic body 23 in position.

Figure 2:
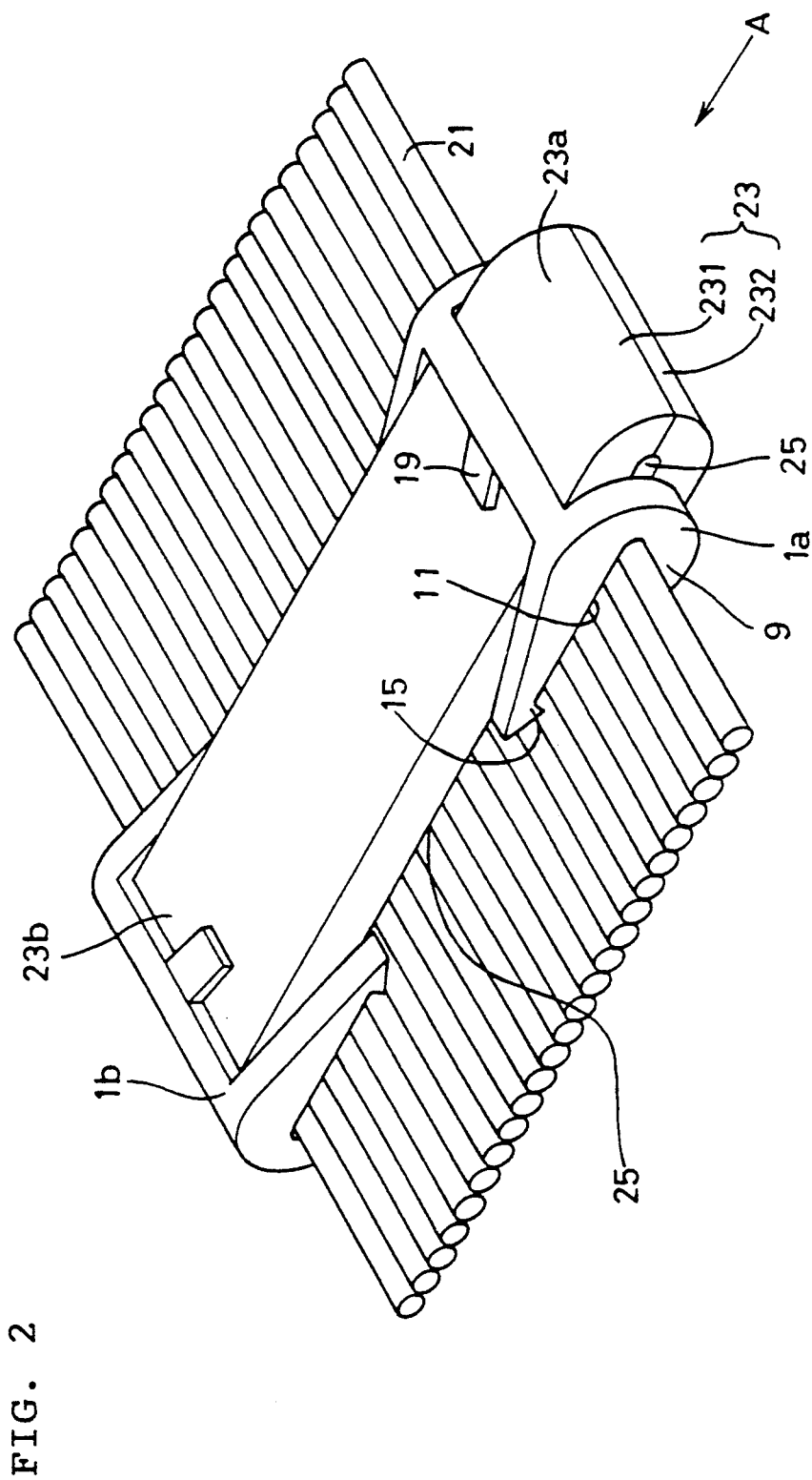
FIG. 2 is an explanatory view showing how the electrical noise absorber of the first embodiment is used.

As shown in FIG. 2, a flat cable 21 is held by the magnetic body 23 having a hollow elliptical transverse cross sectional opening and being composed of mating upper and lower C-shaped pieces 231 and 232 abutting on each other along a longer diameter of the elliptical cross section. The recesses in the upper and lower pieces 231 and 232 form a slot 25 in the middle of the magnetic body 23 for allowing the flat cable 21 to pass therethrough.

Alternatively, the magnetic body 23 could be integrally molded as one piece. The flat cable 21 must be first inserted through the slot in the middle of the integrally molded magnetic body, and then connected to an electronic device.

A pair of fixing members 1 as shown in FIG. 1 are used for fixing the flat cable 21 and the magnetic body 23 in place. Specifically, a fixing member 1a is attached to a side edge 23a in the direction shown by the arrow A, and the other fixing member 1b is attached to the other side edge 23b of the magnetic body 23 in a direction opposite to the direction shown by the arrow A. As shown in FIG. 2, the fixing members 1a and 1b are pushed inwardly until the side edges of the flat cable 21 contact the inner edges of the guide slots 11 in the arms 9. When the fixing members 1a and 1b are thus attached to the magnetic body 23 around the flat cable 21, as shown in FIG. 2, a portion of the flat cable 21 engages the projections 13 and the hooks 15 in the arms 9 of the fixing members 1a and 1b. The flat cable 21 is thus secured by the fixing members 1a and 1b. The magnetic body 23, on the other hand, is inserted through the hole 3 in the magnetic body guide 5, is held between a pair of the press or securing members 19, and is thus held immobile relative to the fixing members 1a and 1b.

Consequently, the flat cable 21 and the magnetic body 23 abut or are at least adjacent to each other via the fixing members 1a and 1b. The upper and lower pieces 231 and 232 of the magnetic body 23 abut each other by the press or securing members 19 of the fixing members 1a and 1b. Since the hole 3 for engaging the magnetic body 23 is provided in the magnetic body guide 5 of the fixing members 1, the side edges 23a and 23b can be inserted through the holes 3, and the fixing members 1a and 1b can be slid to the given positions along the length of the magnetic body 23. The magnetic body 23 is then secured between a pair of opposed press members 19 provided on each of the fixing members 1a and 1b. Since the side edges of the flat cable 21 engage the guide slots 11, the projection 13 and the hook 15 of the arms 9, the fixing members 1a and 1b can be secured relative to the flat cable 21.

As aforementioned, the fixing members 1a and 1b are attached to both side edges 23a and 23b of the magnetic body 23, respectively, so that the flat cable 21 is held between the fixing members 1a and 1b. Specifically, the fixing members 1a and 1b are pushed toward each other until the ends of the guide slots 11 engage the side edges of the flat cable 21. Consequently, the flat cable 21 and the magnetic body 23 can be fixed to each other via a pair of the fixing members 1a and 1b.

Figure 3:
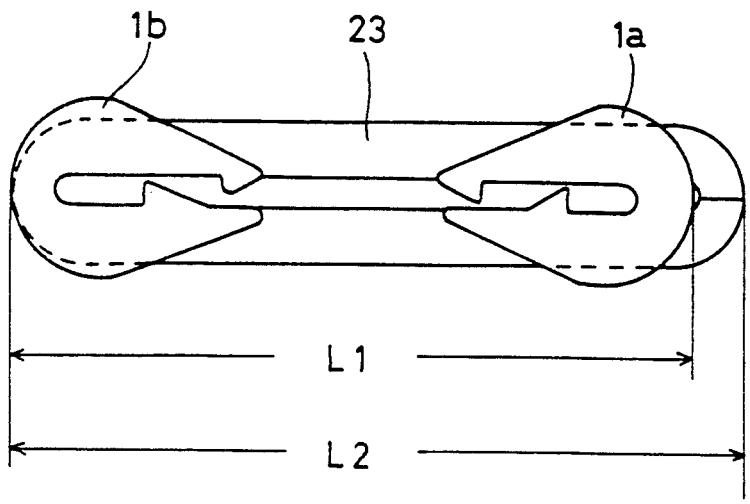
FIG. 3 is an explanatory view showing the relative position of fixing members and a magnetic body in the first embodiment.

As shown in FIG. 3, when the fixing members 1a and 1b are attached to the magnetic body 23, length L1 between the distal ends of the fixing members 1a and 1b is equal to or shorter than length L2 of the magnetic body 23. Different from the prior art, no part of the fixing member 1a or 1b can extend outwardly from the end portions 23a and 23b of the magnetic body 23, thus reducing the mounting space of the electrical noise absorber in this embodiment. If the width of the flat cable 21 is shorter than the inner dimension in the magnetic body 23, the length L1 between the distal ends of the fixing members 1a and 1b can be shortened. The magnetic body 23 and the flat cable 21 can be secured to each other between the fixing members 1a and 1b, thus preventing the lateral displacement of the magnetic body 23, a possible short circuit of the flat cable 21, and other associated problems.

The press or securing members 19 force the upper and lower pieces 231 and 232 of the magnetic body 23 into engagement with each other, and cause the magnetic body 23 to have sufficient magnetic flux density, thus effectively absorbing the electrical noise flowing through the flat cable 21.

Figure 4:
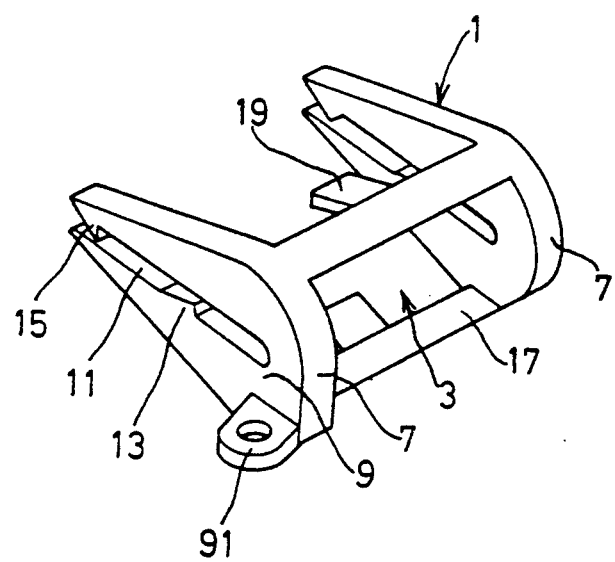
FIG. 4 is an explanatory view showing the modification of the fixing member shown in FIG. 1.

As shown in FIG. 4, by providing a screwing portion 91 attached to a lower part of the arm 9 of the fixing member 1, the electrical noise absorber composed of the magnetic body 23 and the fixing member 1 can be fixedly secured onto a housing or other member of the electronic device.

Figure 5:
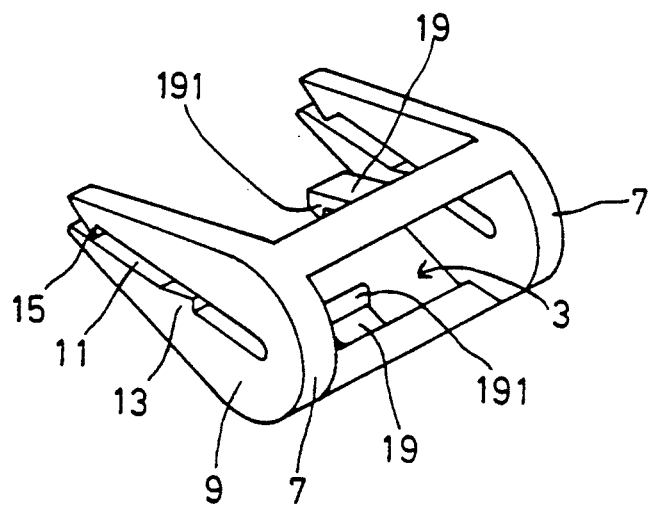
FIG. 5 is an explanatory view showing another modification of the fixing member shown in FIG. 1.
Figure 6:
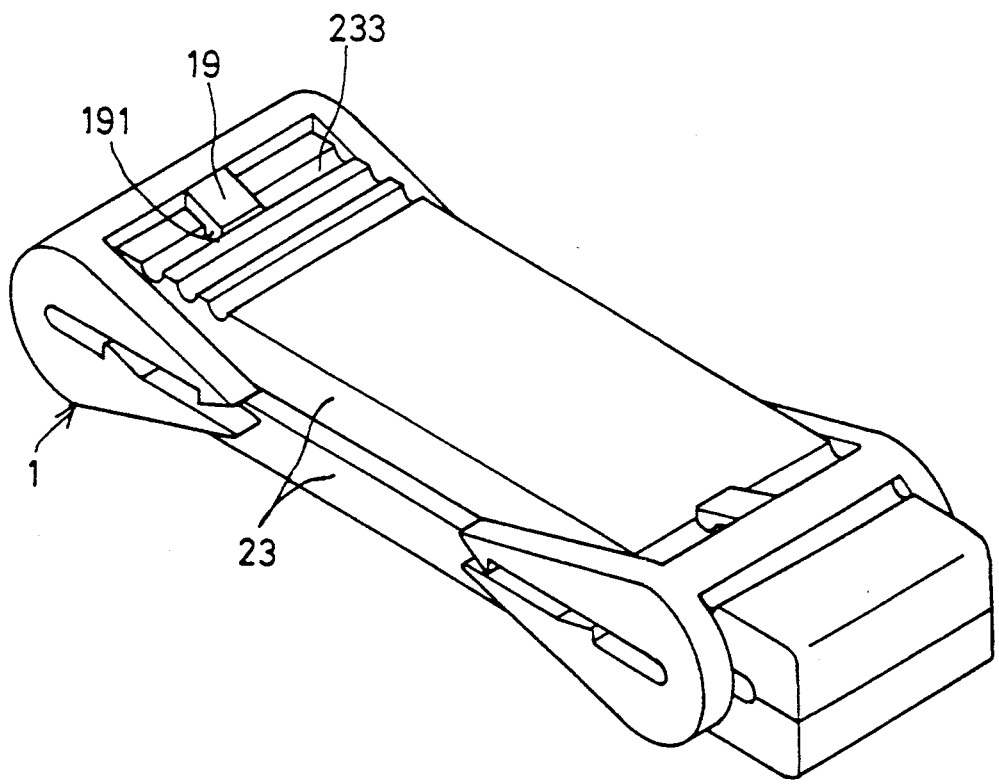
FIG. 6 is an explanatory view showing how the fixing member shown in FIG. 5 is used.

As shown in FIG. 5, when hooks 191 are provided facing each other adjacent the tips of the two opposed press or securing members 19, the fixing member 1 can be applied to the magnetic body 23 having lateral grooves 233 in their side edges. As shown in FIG. 6, by engaging the hooks 191 in the lateral grooves 233, the fixing member 1 can be prevented from inadvertently disengaging from the magnetic body 23.

Figure 7:
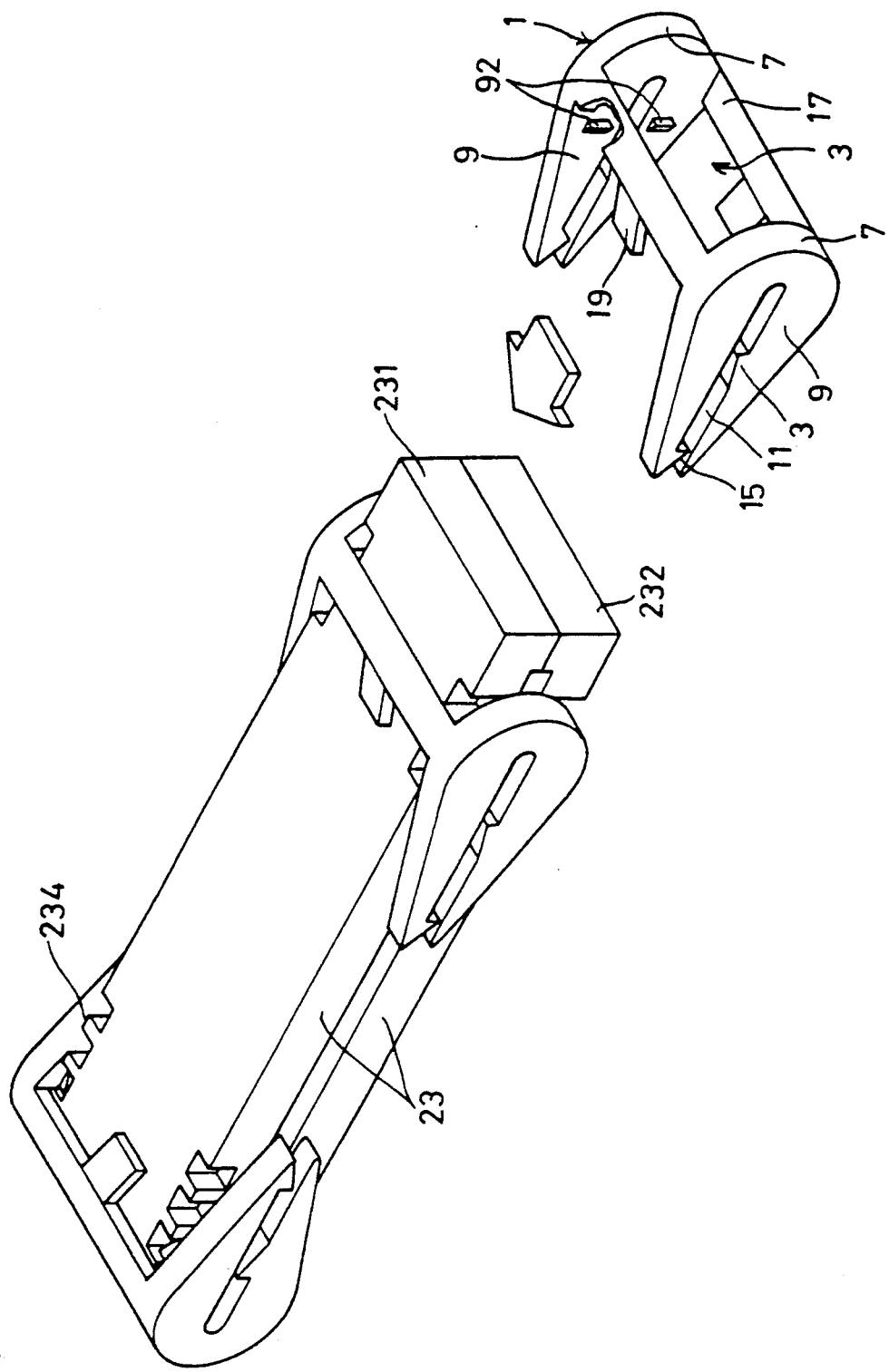
FIG. 7 is an explanatory view showing another modification of the fixing member shown in FIG. 1 and showing how this modified fixing member is used.

As shown in FIG. 7, when a plurality of notches 234 are provided in the side edges of the upper and lower pieces 231 and 232 of the magnetic body 23 and tapering projections 92 are provided on an inner surface of the arms 9 of the fixing member 1, adjacent the hole 3, to engage the notches 234, thus preventing the fixing member 1 from inadvertently disengaging from the magnetic body 23. By engaging in the notches 234 in the upper and lower pieces 231 and 232 of the magnetic body 23, the projections 92 on the arms 9 prevent the upper and lower pieces 231 and 232 from being displaced relative to each other.

The second embodiment of this invention will now be explained referring to FIGS. 8A through 10.

Figure 8A:
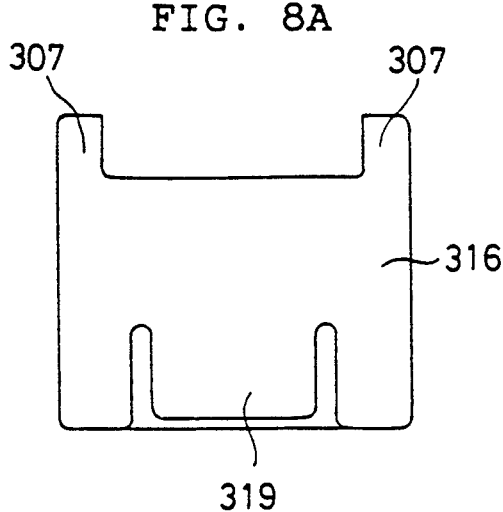
FIGS. 8A through 8E are a plan view, a front view, a bottom view, a rear view and a right side view, respectively, of the fixing member of the electrical noise absorber for the second embodiment of this invention.
Figure 8D:
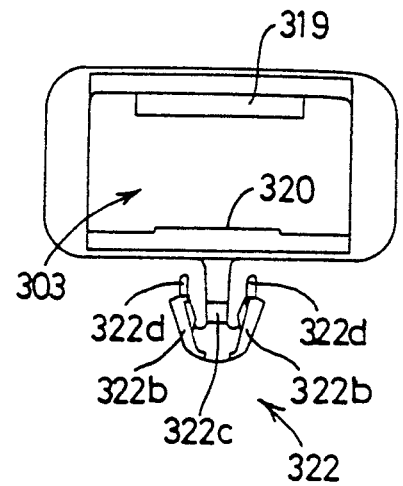
Figure 9A:
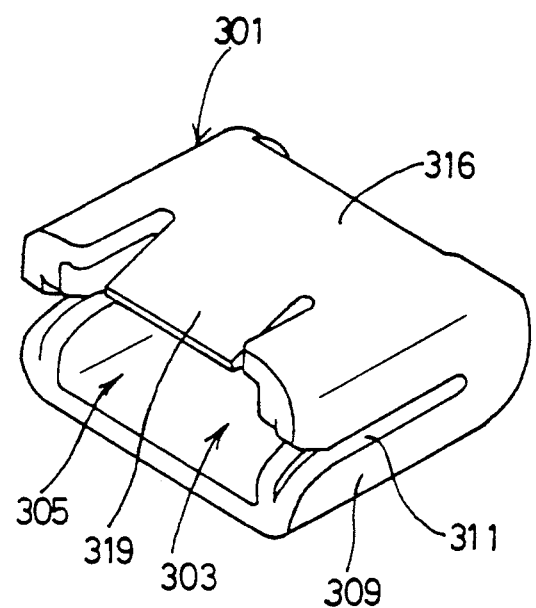
FIGS. 9A and 9B are perspective views seen from the front and rear, respectively, of the fixing member of the second embodiment.
Figure 9B:
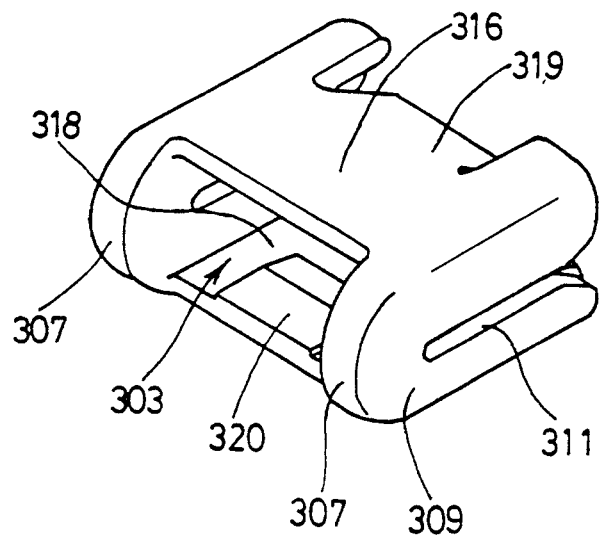
Figure 10:
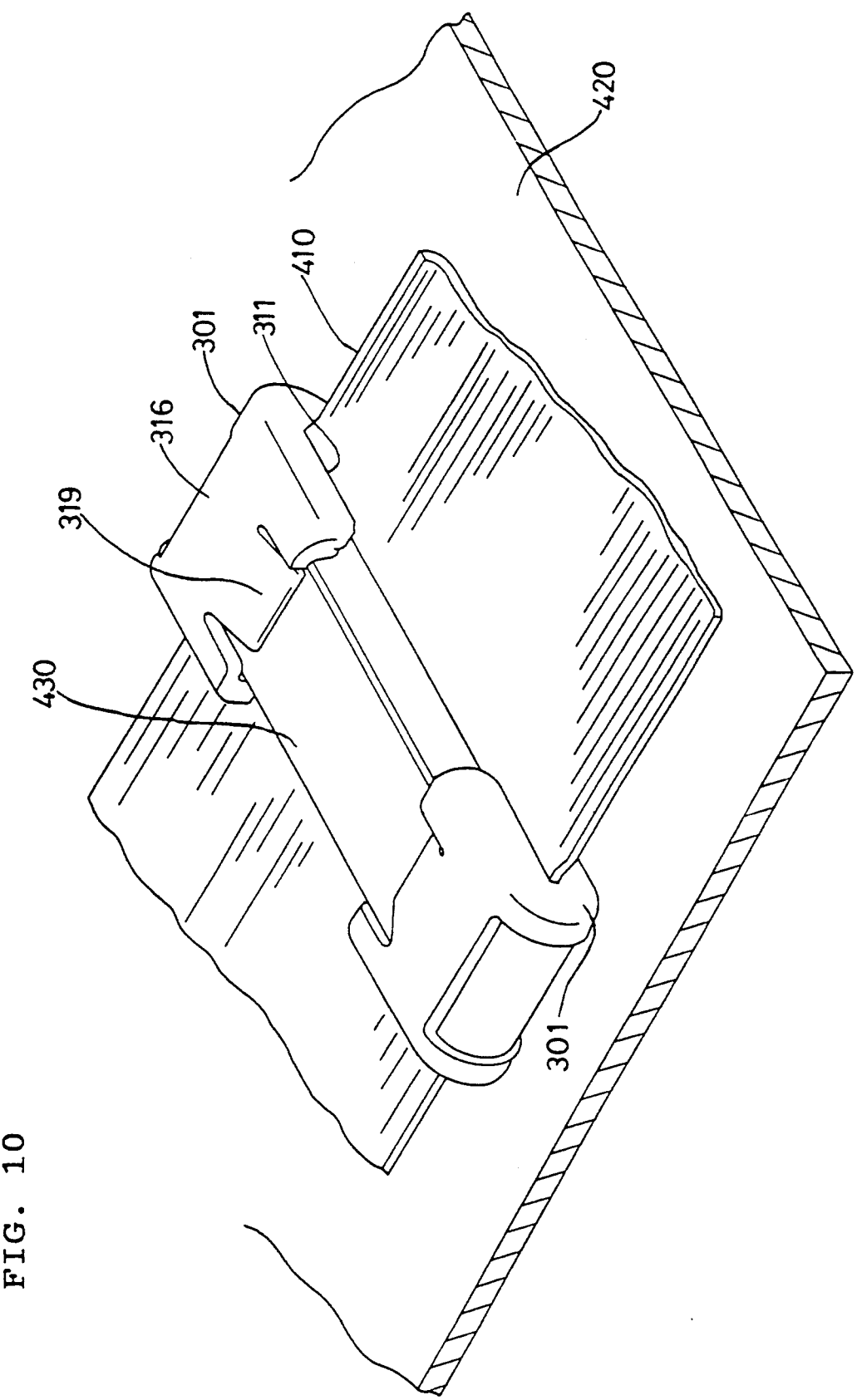
FIG. 10 is an explanatory view showing how the electrical noise absorber of the second embodiment is used.
Figure 11:
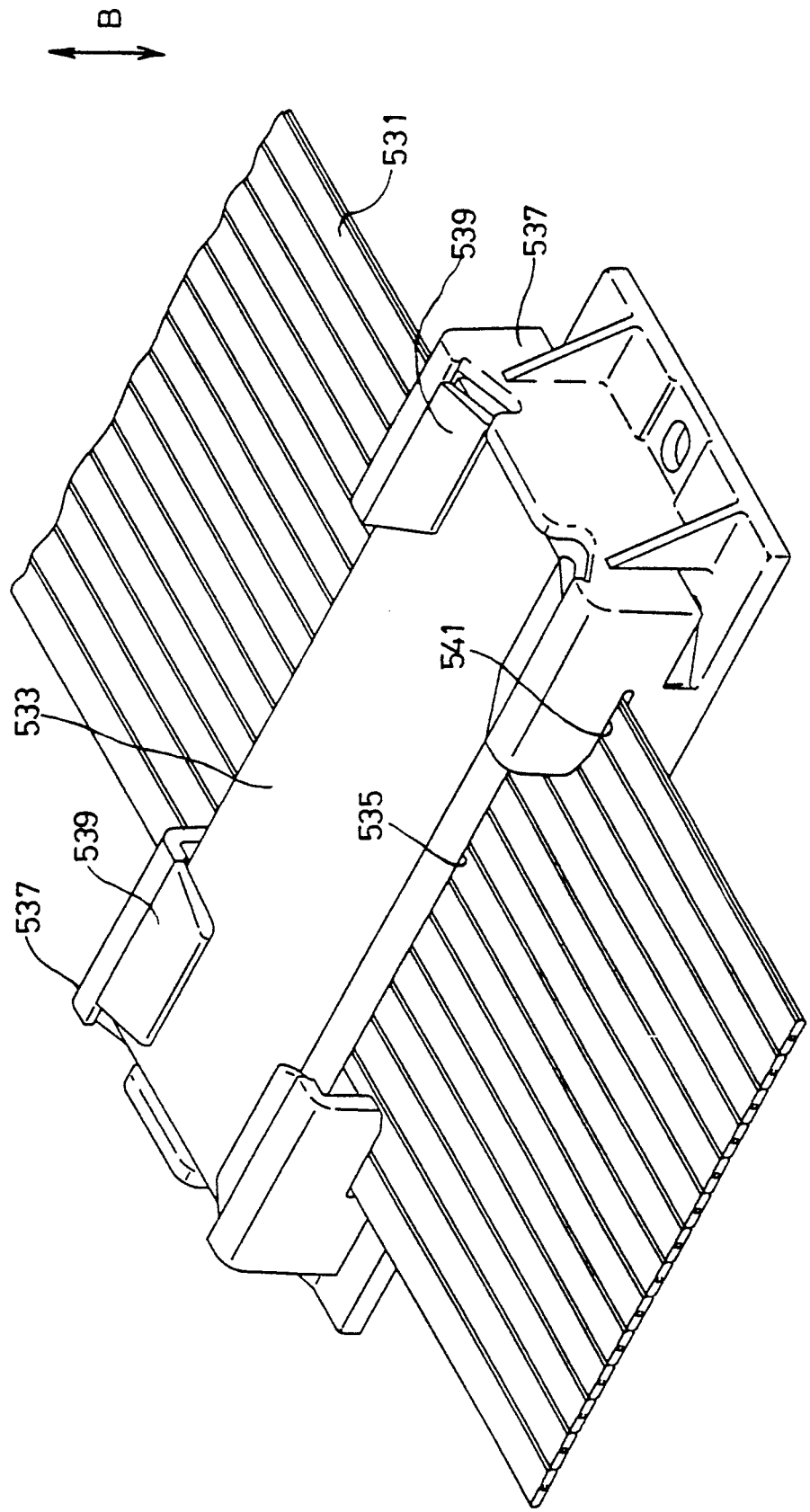
FIG. 11 is a perspective view of a prior-art electrical noise absorber in use.
Figure 12:
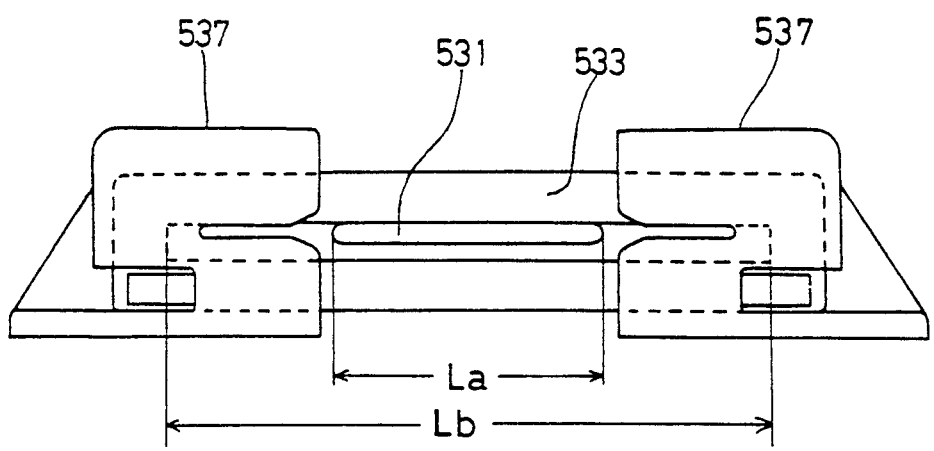
FIG. 12 is an explanatory view showing the associated problems of the prior-art electrical noise absorber.

In the second embodiment, the fixing member 301 comprises a magnetic body guide 305 having a hole 303 penetrating through the fixing member 301 to which a magnetic body 430 is inserted. As shown in FIGS. 8A, 9A and 9B, the fixing member 301 has a press member or tab 319 on its top surface 316 and a projection 320 on its bottom surface 318, for engaging the periphery of the magnetic body 430 inserted into the magnetic body guide 305, as shown in FIG. 10. The projection 320 receives the pressure from the press member 319, through the magnetic body 430, and develops a reactive force, thus pressing the magnetic body 430 between the press member 319 and the projection 320. The magnetic body 430 is held immobile relative to the fixing members 301.

Figure 8B:
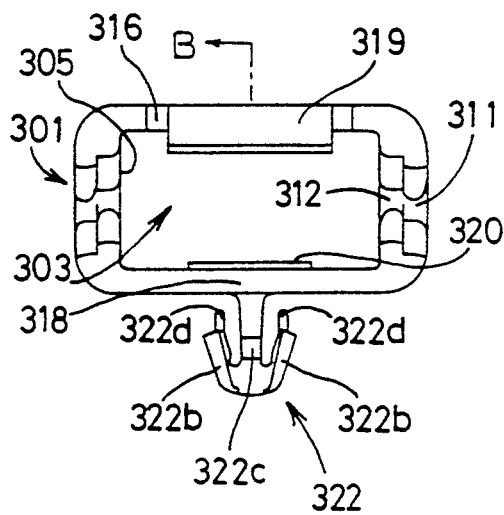
Figure 8E:
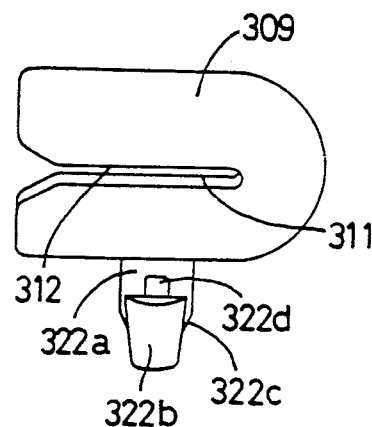
Figure 8C:
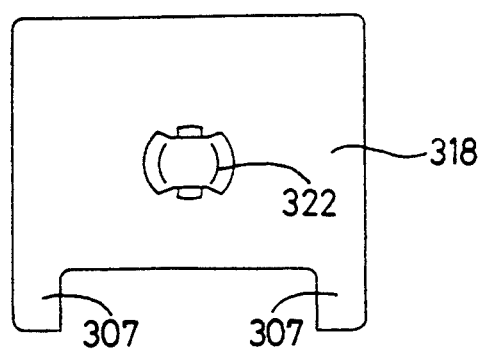

As shown in FIG. 9B, the hole 303 is defined by opposed curved walls 307 extending to form a pair of arms 309 along the direction in which the magnetic body 430 is inserted, and, as shown in FIG. 8B, outer and inner stepped slots 311 and 312 are formed in the arms 309. While being inserted into the fixing member 301, a flat cable 410 is slightly bent as it passes along the outer and inner stepped slots 311 and 312 to gain the restoring force against the force required for bending the flat cable 410, and is thus securely held by pressure of the outer and inner stepped slots 311 and 312 of the arms 309. Consequently, through a pair of the fixing members 301 the flat cable 410 and the magnetic body 430 are secured to each other.

As shown in FIGS. 8B, 8C, 8D and 8E, the fixing member 301 has a resilient anchor 322 projecting from a central portion of the bottom surface 318 of the fixing member 301 for fixing the fixing member 301 to the electronic device. The resilient anchor 322 is composed of a shank 322a extending perpendicularly from around the middle of the bottom surface 318, a pair of resilient anchor arms 322b slanting up and away from a free end of the shank 322a toward the bottom surface 318, and a recessed midsection 322c positioned between the shank 322a and the resilient anchor arms 322b. Projections 322d are provided on the free ends of the anchor arms 322b for preventing slippage in a mounting hole (not shown) of a chassis 420 when the fixing members 301 are secured into the chassis 420.

When the fixing members 301 are secured to the chassis 420 as shown in FIG. 10, the anchor 322 is first snapped into the mounting hole in the chassis 420 by squeezing the anchor arms 322b through the mounting hole in the chassis 420. Then, the anchor arms 322b spread out of the mounting hole, while the projections 322d resiliently deform in the mounting hole of the chassis 420. The recessed midsection 322c of the resilient anchor 322 facilitates the insertion through the mounting hole, and allows rounded corners between the arms 322b and the underside of the chassis 420, thus reducing fatigue when the fixing members 301 are separately secured to the chassis 420.

In the second embodiment, the bottom surface 318 of the fixing member 301 has an area large enough to allow a firm surface contact with a top surface of the chassis 420. Therefore, the fixing member 301 could alternatively be secured to the chassis 420 or other housing of the electronic device by using a double coated adhesive tape, instead of providing the resilient anchor 322 on the bottom surface 318.

In FIG. 10 the inner periphery of the fixing member 301 contacts the side edge of the magnetic body 430. If the width of the flat cable 410 is narrower than the inner dimension of the magnetic body 430, the fixing members 301 can be further pushed inwardly until the slot ends of the fixing members 301 engage the side edges of the flat cable 410. The length between the distal ends of the fixing members 301 can thus be adjusted according to the width of the flat cable 410 in the same way as in the first embodiment.

Consequently, in the same way as in the first embodiment, the second embodiment can provide an electrical noise absorber composed of the pair of fixing members 301 for fixing the magnetic body 430 and the flat cable 410 in place without relative displacement, even if the width of the flat cable 410 is narrower than the inner dimension of the magnetic body 430.

This invention has been described above with reference to preferred embodiments as shown in the drawings. Modifications and alterations may become apparent to one skilled in the art upon reading and understanding the specification. Despite the use of embodiments for illustration purposes, however, it is intended to include all such modifications and alterations within the scope and spirit of the appended claims.

Wherefore, having thus described the present invention, what is claimed is:

1. An electronic noise absorber comprising a magnetic body for completely encompassing a portion of a flat cable connected to an electronic device and absorbing electrical noise flowing through that flat cable, and a fixing member for securing said magnetic body to the flat cable, wherein said fixing member comprises a pair of opposed sidewalls extending along a longitudinal axis of said fixing member, means for interconnecting at least a portion of each of said pair of opposed sidewalls to one another, said means for interconnecting and said opposed sidewalls defining a through hole in said fixing member which lies on the longitudinal axis and facilitates movement of said fixing member relative to one end of said magnetic body when engaged therewith, each of said opposed sidewalls contains an elongate guide slot extending parallel to the longitudinal axis which has cable fixing means for engaging and securing a side edge portion of the flat cable when engaged therewith, and engaging means located adjacent said through hole for contacting an exterior surface of said magnetic body when inserted through said through hole of said fixing member.

2. An electronic noise absorber according to claim 1, wherein said electronic noise absorber further comprises a second like fixing member for engaging a second end of said magnetic body.

3. An electronic noise absorber according to claim 2, wherein said guide slot formed in each of said opposed sidewalls defines a pair of arms on either side thereof, and said cable fixing means comprises a projection carried by one of said arms and a hook carried by said other arm for engaging the side edge portion of the flat cable.

4. An electronic noise absorber according to claim 2, wherein said means for interconnecting comprises a pair of opposed cross beams interconnecting said pair of opposed sidewalls.

5. An electronic noise absorber according to claim 4, wherein said engaging means comprises a securing tab carried by each of said cross beams, and said securing tabs are positioned to contact the exterior surface of said magnetic body, when inserted through said through hole, and prevent relative movement of said magnetic body relative to said fixing member.

6. An electronic noise absorber according to claim 2, wherein said magnetic body defines a hollow elliptical transverse cross-sectional opening therethrough sized to accommodate the flat cable.

7. An electronic noise absorber according to claim 6, wherein magnetic body is molded as a single part.

8. An electronic noise absorber according to claim 6, wherein said magnetic body comprises a pair of mating first and second pieces which, when mated with one another, defining he opening for accommodating the flat cable.

9. An electronic noise absorber according to claim 2, wherein said engaging means comprises a pair of inwardly facing hook members supported adjacent said through hole by said means for interconnecting, and said magnetic body is an elongate member having a plurality of lateral grooves in an outer surface thereof adjacent each end of said elongate magnetic body and positioned to communicate with said hook members, whereby said hook members engage one of the lateral grooves and releasably secure said magnetic body, when passed through said through hole, to said fixing member.

10. An electronic noise absorber according to claim 2, wherein at least one tapering projection is provided on an inner surface of each of said pair of sidewalls adjacent said through hole for engaging mating notches provided in side edges of said magnetic body and positioned to engage the tapering projections, when said magnetic body passed through said through hole, for securing said magnetic body to said fixing member.

11. An electronic noise absorber according to claim 2, wherein said electronic noise absorber further comprises means for fixedly securing each of said noise absorbers to a desired surface.

12. An electronic noise absorber according to claim 1, wherein said means for interconnecting comprises a pair of opposed planar spaced apart surfaces interconnecting side edges of said pair of opposed sidewalls.

13. An electronic noise absorber according to claim 12, wherein said electronic noise absorber further comprises a second like fixing member for engaging a second end of said magnetic body.

14. An electronic noise absorber according to claim 12, wherein said engaging means comprising an inwardly facing tab supported by a first surface of said electronic noise absorber and an opposed inwardly facing projection supported by an opposed second surface of said electronic noise absorber.

15. An electronic noise absorber according to claim 12, said cable fixing means comprises a pair of inner and outer stepped formations positioned to engage and secure said electronic noise absorber to the flat cable.

16. An electronic noise absorber according to claim 12, wherein resilient anchor means, projecting from a bottom surface of said fixing member, is provided for securing said fixing member to a desired surface.

17. An electronic noise absorber according to claim 16, wherein said anchor means comprises a shank having a first end thereof secured to the bottom surface and extending substantially perpendicular therefrom, a second end of said shank supports a pair of anchor arms extending toward the bottom surface, and a recessed middle section is located between said pair of anchor arms and the bottom surface.

18. An electronic noise absorber according to claim 12, wherein a bottom surface of said fixing member has a sufficient surface area to facilitate attachment of said fixing member to a desired surface by a double-sided adhesive tape.

19. A method for attaching an electronic noise absorber comprising a magnetic body for completely encompassing a portion of a flat cable connected to an electronic device and absorbing electrical noise flowing through that flat cable, and first and second fixing members for securing said magnetic body to the flat cable, wherein each of said first and second fixing members comprises a pair of opposed sidewalls extending along a longitudinal axis of said fixing member, means for interconnecting at least a portion of each of said pair of opposed sidewalls to one another, said means for interconnecting and said opposed sidewalls defining a through hole of said fixing member which lies on the longitudinal axis and facilitates movement of said fixing member relative to said magnetic body when engaged therewith, each of said opposed sidewalls contains an elongate guide slot extending parallel to the longitudinal axis and having cable fixing means for engaging and securing a side edge portion of the flat cable when engaged therewith, and engaging means located adjacent said through hole for contacting an exterior surface of said magnetic body when inserted through said through hole of said fixing member;

said method comprising the steps of:

completely encompassing the flat cable with said magnetic body, engaging said glide slots of said first fixing member with a first side edge of the flat cable with a first end said magnetic body passing through said through hole of said fixing member until an end portion of said guide slot contacts the first side edge of the flat cable; and engaging said glide slots of said second fixing member with a second opposite side edge of the flat cable with the second end of said magnetic body passing through said through hole of said second fixing member until an end portion of said guide slot contacts an opposite second side edge of the flat cable.

* * * * *